United States Patent Office 2,811,145
Patented Oct. 29, 1957

2,811,145

METHOD OF OPERATING A COMPRESSION IGNITION INTERNAL COMBUSTION ENGINE

Hobert D. Young, Hammond, Ind., assignor, by mesne assignments, to Sinclair Research Laboratories, Inc., New York, N. Y., a corporation of Delaware No Drawing. Application February 28, 1956,
Serial No. 568,411

13 Claims. (Cl. 123—1)

My invention relates to the operation of internal combustion engines of the compression ignition type. Compression ignition engines have advantages as compared to spark ignition engines for certain applications, particularly for moving heavy duty loads. In addition, they have inherent advantages of lower specific fuel consumption and capacity for burning heavier fuels. It is well understood, however, that although fuel of a different type than gasoline is thus available to the compression ignition engine, the ignition quality of the fuel employed must meet certain highly limiting specifications for satisfactory operation. Thus, conventional medium and high speed diesel or compression ignition engines require diesel fuels having ignition quality in terms of a cetane number above 40, usually about 45 to 55. This requirement virtually restricts commercially useful diesel fuels to straight run distillate fuels from selected crude oils of paraffinic or mixed base type. The use of highly cracked gas oils or cycle stocks from thermal and catalytic cracking operations is largely eliminated except as they may be blended off with high cetane number stocks. Highly cracked gas oils predominate in cyclic compounds of aromatic or naphthenic nature. Diesel engines of conventional compression ratios will not start on many low grade cycle stocks and in any event operate poorly and inefficiently due to detonation, exhaust smoking and rough operation. This situation represents a serious problem for both the oil industry and for the automotive industry. The oil industry faces the pressure of difficult-to-meet demands for high quality diesel fuels and the problem of disposing of a vast accumulating supply of cycle oils boiling in the diesel fuel range. The automotive industry is limited in terms of design and marketability of compression ignition engines by reason of the necessary ignition quality of fuel that must be employed and its availability.

My invention provides a method for operating compression ignition engines on fuels of low ignition quality, indeed on fuels that are generally considered incapable of continuous use in conventional engines. My invention further provides a bi-fuel combustion system for compression ignition engines that possesses advantages in ease of starting and in efficiency of performance. My method is employed for operating engines over a substantial period of time, usually at least one hour, and not just during the starting or warming of the engines.

I have discovered that it is possible to burn low cetane number fuels at conventional compression ratios if a small amount of a relatively high cetane number secondary fuel is passed to the combustion cylinders before introduction of the primary low cetane fuel. For example, I have found that it is possible to burn a highly aromatic cycle stock having a cetane number of around zero or worse as a primary fuel and obtain continuous engine operation at a compression ratio of 11.6 to 1 by carbureting about 4 percent of normal heptane into the air intake of the engine simultaneously with normal injection of the primary fuel. The primary fuel in this case was of such poor ignition quality that it was impossible to burn it straight or in blends of up to 50 percent with a premium grade diesel fuel at a compression ratio of 23 to 1, which was about the compression ratio limit of the test engine employed. I have found that useful secondary fuels have relatively low self-ignition temperatures, e. g. having spontaneous ignition temperatures below about 500° F., and are generally characterized by being normally liquid and of high cetane number of the order of about 45 or above, e. g. preferably at least about 50 or 55. Fuels of cetane number as high as 250 (estimated) have been found successful. Among the most useful secondary fuels are aliphatic hydrocarbons of straight chain, saturated structure of six to sixteen carbon atoms such as n-heptane or n-octane and advantageously relatively light petroleum fractions predominating in hydrocarbons of the paraffinic type such as kerosene, No. 1 and No. 2 fuels, lubricating oils and other distillate fractions which do not contain material amounts of cracked components. Generally, these fractions have end boiling points (ASTM) which are not above about 700° F., with exception of the lubricating oils which ordinarily would have a maximum viscosity of about 200 SUS at 100° F. The secondary fuels may comprise paraffinic derivatives such as ethers, alkyl nitrates, aldehydes and alcohols, but must be low boiling in distillation range and high in cetane number. I have found that ordinary motor gasoline, for example, is relatively ineffective as a secondary fuel, apparently due to its hydrocarbon composition manifested by low cetane number and high spontaneous ignition temperature.

The induction of the secondary fuel with the normal air stream to the engine cylinders appreciably promotes the effectiveness of the secondary fuels employed as does injection of the secondary fuel directly into the cylinder by atomization. In either method, the secondary fuel in the cylinder is dispersed in air normally provided for combustion of the primary fuel. The resulting prolonged aeration appears to add to the catalytic effect on the ignition and combustion of the aromatic and naphthenic rich primary fuels. I am not able to definitely establish the combustion mechanism involved but it may be that the apparent thermal instability of the aliphatic materials of the secondary fuels, particularly with respect to susceptibility to form peroxides, contributes to the initial utility of the secondary fuels and particularly to their improved effectiveness upon aeration. In any event, it is significant that blending the requisite proportions of secondary fuel with the primary fuel merely results in predictable changes in physical and combustion quality without producing a fuel of useable quality. Moreover, photographic data, representing pressure-time diagrams obtained by means of strain gage or capacitance type pick-ups mounted in the turbulant chamber of a test engine and connected to associated electronic and oscillographic equipment, indicate that partial oxidation occurs within the combustion chamber after introduction of the secondary fuel. Maximum pressure differentials usually appear between top dead center of the cylinder and a point subsequent to the introduction of secondary fuel. Thus, instead of the usual ignition effected by the heat of compression, combustion is apparently triggered by a preflame reaction which occurs after introduction of the secondary fuel.

The secondary fuels are believed to exhibit cool flame phenomena to a marked degree under the pressure and temperature conditions which exist in an engine cylinder at the start and through the early part of the compression stroke. These phenomena may be responsible for triggering ignition of the primary fuel injected into the cylinder near the top of the compression stroke. It is further thought that upon introduction of a relatively small quantity of secondary fuel into the engine cylinder a homogeneous environment of secondary fuel and air is formed due to turbulence within the cylinder and partial oxidation of the fuel occurs. This oxidation is accompanied by luminescence of the fuel particles. Into this luminescent environment, which is initiated shortly after the start of the compression stroke and progresses throughout most of this stroke, primary fuel is injected. This fuel undergoes vaporization and preflame oxidation until a point is reached in the oxidation process of the primary fuel where the reacting secondary fuel brings about flammation of the entire surface of the spray envelope. This differs from the conventional auto-ignition process in compression ignition engines wherein flammation proceeds from a single point in the spray envelope farthest from the injector. It is this multi-phase surface ignition phenomenon which seems to occur in my method, plus the virtual absence of ignition delay of the primary fuel which result in engine smoothness and low rate of pressure rise permitting engines to be operated satisfactorily on otherwise unsuitable fuels at normal engine compression ratios.

Generally, to avoid two distinct combustions within the cylinder the secondary fuel is introduced at least about 45 degrees before top dead center of the compression stroke so that the secondary fuel is undergoing oxidation when the primary fuel enters the cylinder. Thus, the secondary fuel is introduced into the cylinder before the primary fuel, and preferably the former enters just prior to or shortly after the start of the compression stroke. When the secondary fuel enters with the engine's normal air supply, timing is more or less set by the engine construction; however, when the secondary fuel is atomized directly into the cylinder timing of the secondary fuel injection can be varied as desired. Usually, the secondary fuel will not be injected until the exhaust is closed since this would give rise to needless fuel loss.

According to my invention, the low cetane number primary fuel is handled in the conventional fuel system comprising tank, pump and injection system, and a minor quantity of high cetane number secondary fuel advantageously comprising a mixture of light petroleum hydrocarbons is introduced either by induction with the main air supply to the cylinders or by antomization from a separate secondary fuel system. In the separate system the liquid fuel is usually atomized into the cylinder from a liquid line nozzle, i. e. not in admixture with air. Since the normal air supply is in the cylinder upon atomization of the secondary fuel, the fuel becomes dispersed in the air supply. In my method the basic four-stroke or two-stroke cycles of the reciprocating piston type are employed under the usual ranges of engine operating conditions. Even when the secondary fuel is inducted into the cylinder with the air supply, a separate fuel system is employed for the secondary fuel. Also, in this manner of operation a carburetor or other metering device is used to aspirate the fuel into the air stream of the air intake manifold. For example, an ordinary carburetor with flow control governed by the rack or throttle control of the injection pump may be employed. As the throttle governing the main fuel supply is opened, the carburetor orifice controlling secondary fuel flow is opened through a linkage and aspiration into the engine is effected.

The primary fuels useful in the method of the present invention are normally liquid hydrocarbon materials having a cetane number not greater than about 40, preferably not greater than about 35. The cetane number can be 0 or even less. The fuels contemplated range in API gravity from about 5 to 75. Suitable materials include petroleum residuals having a gravity of up to about 20, intermediate boiling fractions of about 20 to 50 gravity, and light distillates of say about 50 to 75 API gravity which is the gasoline range. It is indeed surprising that my method is particularly useful in operating diesel engines on primary fuels having cetane numbers separated as widely as those of residuals and gasolines. The residuals are economical fuels which in my method can be employed without undue engine wear while the use of gasoline is advantageous in a military operation where a single fuel is desired for both diesel and spark ignition engines.

The choice of the primary fuel can depend upon many factors among which is the size of the engine to be operated. Residual materials are particularly useful in heavy engines of less than about 500 R. P. M. and I have found that by the use of my method such fuels can even be employed in engines of middle speed, for instance 500 to 1000 R. P. M., and of high speed greater than 1000 R. P. M. For the higher speed engines the residual or other heavy fuel should be reduced in viscosity through heating or dilution to give a fuel of less than about 125 SUS at the injection nozzle. With medium and slow speed engines the viscosity of the heavy fuel should be reduced to less than about 175 SUS at the injection nozzle. The various primary fuels which I can employ can contain cracked stocks and may be composed predominantly or even entirely of such materials. Thus, the primary fuels may contain n-paraffins, isoparaffins, naphthenes, aromatics and olefins. As an example, benzene, cetane number below 0, which can be burned only with difficulty in compression ignition engines at compression ratios in excess of 28:1, has been burned satisfactorily at compression ratios of 16:1 or less when using my present method.

Depending on the method used for introducing secondary fuel as well as the type of secondary fuel employed an advantageous aspect of my invention, permits starting an engine on secondary fuel and then switching over to bi-fuel operation whenever the engine has warmed up sufficiently to carry load with the primary fuel. In this aspect of my invention, the inherent starting difficulties of compression ignition engines are largely overcome, especially under cold weather starting conditions. For this purpose I have found that secondary fuels which comprise hydrocarbon mixtures high in cetane quality such as n-heptane, n-octane- and even as high as n-decane-cuts from virgin paraffinic-type naphthas are especially useful. About 15 to 50 percent of an ether such as diethyl ether may advantageously be blended into the mixture comprising the secondary fuel.

I have also found that the load performance of medium and high speed diesel engines utilizing diesel fuels in the range of borderline ignition quality (about 30 to 40 cetane number) may be improved by operating the engine in the usual manner in the lower output range and switching to bi-fuel combustion operation as the smoke limit and fuel injection quantity limit are reached. Thus one of the important criteria for maximum power developed on the piston of a compression ignition engine is the amount of air which the engine can inhale and utilize effectively. As the amount of fuel injected into the engine cylinders increases in the higher power ranges, the air to fuel ratio decreases to a limiting point inasmuch as the quantity of air inducted is constant over the range of power settings and the exhaust becomes colored or smoky with incompletely burned fuel. According to this aspect of my invention, bi-fuel combustion is employed as the exhaust smoke limit is reached to permit an additional power increment. I have found, however, that when the maximum amount of secondary fuel which can be used for effective combustion, e. g. about 40 percent depending upon the nature of the secondary and the primary fuels and the type and size of the engine, is exceeded, poor combustion and increase in exhaust smoke occurs.

The following examples will further indicate the nature of my invention but they are not to be considered limiting. Examples I and II present test data obtained in a single cylinder ASTM diesel test engine. The apparatus used for carbureting the secondary fuel consisted of a 100 cc. burette mounted adjacent to the regular fuel tanks. The burette was connected by means of flexible tubing to a small needle valve and then to a 0.014-inch diameter orifice mounted in the elbow of the air intake horn of the intake manifold. The orifice was made of drawn copper tubing bent in the form of a gooseneck. The orifice was located in the center of the air intake pipe with the opening pointed downstream. A Hoke needle valve was inserted between the orifice and burette in order to provide better flow control.

Example I

In the engine tests of this example the standard ASTM diesel fuel rating procedure was followed. Under this procedure, that engine compression ratio is determined which will give a primary fuel ignition delay of 13°, that is combustion at top dead center with injection advance at 13° before top center, with the engine operating at the following standard conditions:

Speed _____ 900 R. P. M.
Inj. adv. of primary fuel____ 13° BTDC.
Approx. start of combustion
 of primary fuel_____ TDC.
Fuel rate_____ 13 cc./min. (primary fuel).
Air inlet temperature_____ 150° F.
Primary fuel inj. pressure___ 1500 p. s. i.

The operating compression ratio of the primary fuel was first obtained. Then the reduction in compression ratio was determined, under the same operating conditions, for the carburetion of various percentages of secondary fuel into the air intake with simultaneous injection of primary fuel. The reduction in compression ratio was taken as a measure of the ability of an engine to burn a primary fuel which might be otherwise too low in ignition quality to burn satisfactorily when injected in the regular manner.

The secondary fuel used in the tests of this example was a technical grade normal heptane product. The primary fuels employed had the following characteristics:

|  | Fuel A | Fuel B | Fuel C | Fuel D |
|---|---|---|---|---|
| Gravity, API | 20.2 | 34.2 | 25.1 | 23.0 |
| Specific Gravity | .9328 | .8545 | .9036 | .9159 |
| Wt./Gal., Lbs. | 7.768 | 7.115 | 7.524 | 7.627 |
| Calculated Heat Value B. t. u./Lb. | 19,009 | 19,563 | 19,224 | 19,134 |
| Calculated Heat Value B. t. u./Gal. | 147,660 | 139,191 | 144,644 | 145,935 |
| Flash, PM | 214 | 123 | 218 | 172 |
| Saybolt Vis. at 100° F. (Sec.) | 34.4 |  | 36.6 | 33.3 |
| Aniline Pt., °F | 47.5 | Below 21° F. | 104 |  |
| Distillation, IBP | 436 | 331 | 442 | 334 |
| Distillation, EP | 602 | 386 | 660 | 606 |
| Calculated Cetane No. | 16.7 | 16.5 | 26.1 | 22.5 |

Engine tests under these conditions showed that a reduction in compression ratio was brought about for the four fuels tested by use of a secondary fuel. However, for a specific percentage of secondary fuel the effective reduction in compression ratio of the various primary fuels differed considerably. The lower the ignition quality of the primary fuel, the more effective was the secondary fuel in bringing about smooth combustion within the normal compression ratio range of the diesel engine. This is difficult to explain and interestingly enough reflects a reverse degree of improvement than is obtained with diesel fuel additives. With an additive, the lower the ignition quality of the base fuel, the less effective is the additive.

The following data illustrate the improvement effected by application of the bi-fuel combustion system according to my invention. It is particularly noteworthy that it was impossible to burn fuel A, a blend of cycle stock and an aromatic solvent cut of about 16.7 calculated cetane number at the compression ratio of the engine of about 23 to 1 while combustion was smooth with about 5 percent of secondary fuel at a compression ratio of 11.6 to 1.

PRIMARY FUEL A

|  | Primary Fuel Only | Primary Plus Secondary Fuels |
|---|---|---|
| Sec. Fuel Flow, cc./Min | 0 | 0.7 |
| Primary Fuel Inj., cc./Min | 13.0 | 13.0 |
| Total Fuel Burned, cc./Min | 13.0 | 13.7 |
| Percent Sec. Fuel Used Based on Total Fuel Burned | 0 | 5.1 |
| Compression Ratio | [1] 23:1 | 11.6:1 |
| Compression Ratio Diff |  | 11.4 |

[1] No ignition.

PRIMARY FUEL B

|  | Primary Fuel Only | Primary Plus Secondary Fuels | | |
|---|---|---|---|---|
| Sec. Fuel Flow, cc./Min | 0 | 1.0 | 1.2 | 2.01 |
| Primary Fuel Inj., cc./Min | 13.0 | 13.0 | 13.0 | 13.0 |
| Total Fuel Burned, cc./Min | 13.0 | 14.00 | 14.20 | 15.01 |
| Percent Sec. Fuel Used Based on Total Fuel Burned | 0 | 7.15 | 8.45 | 13.33 |
| Compression Ratio: |  |  |  |  |
|  Primary Fuel | 22.84:1 | 22.84:1 | 22.79:1 | 22.84:1 |
|  Primary Fuel+Sec. Fuel |  | 19.09:1 | 18.97:1 | 14.85:1 |
| Compression Ratio Diff |  | 3.75 | 3.82 | 7.99 |

PRIMARY FUEL C

|  | Primary Fuel Only | Primary Plus Secondary Fuels | | |
|---|---|---|---|---|
| Sec. Fuel Flow, cc./Min | 0 | 0.6 | 1.2 | 1.7 | 2.0 |
| Primary Fuel Inj., cc./Min | 13.0 | 13.0 | 13.0 | 13.0 | 13.0 |
| Total Fuel Burned, cc./Min | 13.0 | 13.6 | 14.2 | 14.7 | 15.0 |
| Percent Sec. Fuel Used Based on Total Fuel Burned | 0 | 4.40 | 8.45 | 11.55 | 13.35 |
| Compression Ratio: |  |  |  |  |  |
|  Primary Fuel | 16.36:1 | 16.36:1 | 16.38:1 | 16.53:1 | 16.53:1 |
|  Primary Fuel+Sec. Fuel |  | 15.40:1 | 15.35:1 | 14.44:1 | 14.16:1 |
| Compression Ratio Diff |  | 0.96 | 1.03 | 2.09 | 2.37 |

PRIMARY FUEL D

|  | Primary Fuel Only | Primary Plus Secondary Fuels | | | | |
|---|---|---|---|---|---|---|
| Sec. Fuel Flow, cc./Min | 0 | 0.5 | 0.6 | 1.2 | 1.6 | 2.0 |
| Primary Fuel Inj., cc./Min | 13.0 | 13.0 | 13.0 | 13.0 | 13.0 | 13.0 |
| Total Fuel Burned, cc./Min | 13.0 | 13.5 | 13.6 | 14.2 | 14.6 | 15.0 |
| Percent Sec. Fuel Used Based on Total Fuel Burned | 0 | 3.70 | 4.50 | 8.40 | 10.96 | 13.30 |
| Compression Ratio: |  |  |  |  |  |  |
|  Primary Fuel | 15.88 | 15.88 | 15.96 | 15.26 | 15.25 | 15.25 |
|  Primary Fuel+Sec. Fuel |  | 15.00 | 15.03 | 14.26 | 13.85 | 13.24 |
| Compression Ratio Diff |  | 0.88 | 0.93 | 1.00 | 1.40 | 2.01 |

Example II

In the tests of this example, similar equipment was utilized operated under the following conditions:

Compression ratio_____ 15:1
Speed, R. P. M._____ 900
Injection advance (primary fuel)___ 13° BTDC.
Fuel rate (primary fuel)_____ 13 cc./min.
Fuel injection pressure (primary fuel) _____ 1500 lbs./sq. inch.
Air inlet temperature_____ 78° F.
Jacket temperature_____ 212° F.

The primary fuels employed were a catalytically cracked light cycle stock of 37.2 cetane number (fuel E)

and a blend of 80 percent alkylate distillate and 20 percent straight run gas oil off an Illinois crude having a cetane number of 32.3 (fuel F). Two types of secondary fuel were used, namely a blend of 65 percent technical normal heptane and 35 percent diethyl ether (secondary fuel 1) and kerosene (secondary fuel 2). In these runs exhaust smoke density measurements were determined with a photoelectric smokemeter. It was determined that approximately 15 to 20 percent of the secondary fuel could be utilized over the maximum limit for the primary fuel alone. The maximum quantity of secondary fuel tolerable appeared to be related to its nature and the nature of the primary fuel. Simultaneously with the determination of exhaust smoke values, visual combustion patterns of the combustion process were observed with oscillographic equipment. The oscillographic combustion patterns indicated that about 12 to 21 percent of secondary fuel represented the preferred upper range of such fuel for good combustion characteristics. Again the quantity depended both upon the characteristics of the primary and secondary fuels used. The test data follow:

|  | Percent Exhaust Smoke Density With Primary Fuel | Exhaust Smoke Density Using Primary and Secondary Fuels | | | | | |
|---|---|---|---|---|---|---|---|
|  | Rate, 13 cc./Min. | Secondary Fuel Used | Approx. Cetane No. | Percent Smoke | cc./Min. Secondary Fuel | Total Fuel Consumption, cc./Min. (Max.) | Percent Secondary Fuel Used (Based on Total Max.) |
| Primary Fuel E: | | | | | | | |
| Trial #1 | 47 | 1 | 75 | 47 | 1.8 | 14.8 | 12.2 |
| Trial #2 | 39 | 2 | 50 | 39 | 2.6 | 15.6 | 16.7 |
| Primary Fuel E: | | | | | | | |
| Trial #1 | 27 | 1 | 75 | 27 | 2.5 | 15.5 | 16.1 |
| Trial #2 | 34 | 2 | 50 | 34 | 3.6 | 16.6 | 21.8 |

Thus, these data show that at a given exhaust smoke density increased horsepower can be realized by my process (denoted by increased fuel input) as compared with operation of the engine on the low cetane primary fuel alone.

Example III

The versatility of my method was illustrated by the successful operation of the ASTM single cylinder 4-cycle engine on primary fuels of widely varying characteristics without encountering difficulties with respect to starting, engine deposits, engine wear, combustion shock or exhaust smoke. The secondary fuel employed was kerosene having a 514° F. final boiling point and a cetane number of 50. About 13% by volume of the secondary fuel was employed. The separate primary fuels used were as follows:

|  | Primary Fuel | |
|---|---|---|
|  | Heavy Residual Fuel, No. 6 Grade | Highly Aromatic Dist., No. 1 Grade |
| Gravity, API | 12.2 | 26.8 |
| Flash, PM, °F | 300 | 150 |
| Vis. at 100° F., SUS | 2700 | 30 |
| Vis. at 210° F., SUS | 110 | |
| Pour, °F | 45 | Below −80 |
| Sulfur, Percent | 2.50 | 4.00 |
| Carbon Residue | 10.87 | |
| Cetane Number | 15 | 10 |
| Distillation: | | |
| I. B. P., °F | 425 | 350 |
| 50% | 915 | |
| 60% | 958 | 458 |
| E. P. | | 543 |

The test conditions under which the above fuels were burned were:

Operating compression ratio: 13:1
Load: ¾ of max-load at 1000 R. P. M.
Test duration: 100 hours
Injection advance (primary fuel): 13° BTDC
Injection advance (secondary fuel): 15° before intake valve closed at start of compression stroke
Combustion chamber: Turbulent
Air intake temperature: 150° F.
Air intake pressure: 29.92 Hg (approx.)

NOTE.—During operation on residual fuel, the fuel was heated to reduce viscosity to approximately 110 SUS at injector.

Example IV

The effect of my process in reducing exhaust smoke was illustrated by operation of the single-cylinder ASTM engine on pressure pipe still tar, which is a heavy aromatic material cut back with catalytically cracked gas oil to approximately 100 SUS at 100° F., gravity API 22.7, cetane number 26.0. A compression ratio of 21:1 was required to ignite this primary fuel without the use of a secondary fuel. Also, when using a continuous filtering type recording smokemeter the exhaust was composed almost entirely of carbon particles giving a black, opaque smoke strip. When using secondary fuels comprising respectively n-heptane and 300 to 400° F. boiling range naphtha, the smoke strips from the engine were gray in color similar to that obtained when operating the engine with a premium grade diesel fuel according to conventional methods.

The ASTM engine was operated for 60 hours on the pressure pipes still tar using kerosene as a secondary fuel and then inspected. The cylinder head, the top of the piston and the piston skirts were essentially free of deposits. Combustion carbon which was present was soft and of the type which could be readily purged from the engine. All piston rings were free.

Example V

A GM 2-cycle 71 series engine was operated employing high octane gasoline as the primary fuel and 11% of n-heptane as the secondary fuel. The laboratory inspections on the primary fuel were as follows:

Gravity, API _____ 52.4
Distillation:
   I. B. P. _____ 105
   10% _____ 172
   50% _____ 244
   90% _____ 301
   E. P. _____ 350
RVP _____ 6.85
Octane No. (research) _____ 86.4

While employing this primary fuel and n-heptane as a secondary fuel the engine was operated satisfactorily for a period of 80 hours at a speed of 1200 R. P. M. and at one quarter of its load capacity.

The same type of GM engine was operated during separate periods respectively, on 50 cetane number premium grade diesel fuel without secondary fuel and on 12 cetane number primary fuel plus 11.3% n-heptane as a secondary fuel. The 12 cetane number fuel inspected is as follows:

| | |
|---|---|
| Gravity, API | 26.9 |
| SUS at 100° F. | 30.9 |
| Aromatics, percent | 58.5 |
| Distillation: | |
| I. B. P. | 362 |
| 10% | 394 |
| 50% | 428 |
| 90% | 465 |
| E. P. | 526 |

After 80 hours of operation at 1200 R. P. M. with each of these fuel systems the overall combustion chamber deposits resulting from the burning of the 12 cetane number fuel using n-heptane as the secondary fuel were about 12% less than those obtained with the 50 cetane number premium diesel fuel test where no secondary fuel was employed.

My invention therefore provides a bi-fuel combustion system which permits ease in starting and which permits the use of low cetane number primary fuels for operation. For continuous operation it contemplates on a preferred basis the use of approximately 4 to 12 percent by volume of secondary fuels of relatively high cetane number. For primary fuels of less susceptibility to improvement and with secondary fuels in the less volatile range, up to about 40 percent of secondary fuel can be employed. In any event, at least about 1 percent is required, and usually about 4 to 20 or 25 percent can be used with advantage. The percents of secondary fuel are based on the volume of the primary fuel employed.

In permitting the use of low cetane number primary fuels, performance is improved by reason of the higher B. t. u. per pound combustion values of these fuels. Fuels having heating values which range up to 10 percent higher than those of conventional fuels of diesel type are made available. In addition, increased mechanical efficiency results by burning the higher B. t. u. fuels at lower compression ratios; for as compression ratio is increased, the frictional horsepower losses become higher so that the net horsepower delivered is decreased. The practical maximum compression ratio limit for conventional diesel engines is about 18 to 1. Compression ratios of approximately 15 to 1 are required for cold weather starting. Consequently a practical limit exists as to the charge pressure which may be developed by supercharging in order to realize additional gains in power. With the bi-fuel system of my invention measurable power gains can be realized in conjunction with the use of high B. t. u. content, low cetane number primary fuels by application of the process to a supercharged engine of designed low compression ratio and inherent high mechanical efficiency.

This application is a continuation-in-part of my application, Serial No. 141,845, filed February 1, 1950.

I claim:

1. In the operation of internal combustion engines of the compression ignition type, the improvement which comprises burning a normally liquid primary fuel having a cetane number not greater than about 40, said operation being effected while inducting with the air supply about 1 to 20 percent by volume based on the primary fuel of a relatively high cetane number secondary fuel generally characterized by substantially straight-chain, paraffinic structure and having a cetane number of at least about 45.

2. The improvement of claim 1 wherein the quantity of secondary fuel inducted approximates about 4 to 12 percent by volume based on the primary fuel.

3. In the operation of internal combustion engines of the compression ignition type, the improvement which comprises starting the engine upon a relatively high cetane number secondary fuel generally characterized by substantially straight-chain, paraffinic structure and having a cetane number of at least about 45, and operating after combustion is initiated upon a normally liquid primary fuel having a cetane number not greater than about 40, said operation on primary fuel being effected while inducting with the air supply about 1 to 20 percent by volume based on the primary fuel of said secondary fuel.

4. In the operation of internal combustion engines of the compression ignition type, the improvement which comprises starting the engine upon a relatively high cetane number secondary fuel generally characterized by substantially straight-chain, paraffinic structure and having a cetane number of at least about 45, then in the low power ranges switching to operation upon a normally liquid primary fuel having a cetane number of about 30 to 40, said operation on primary fuel being effected while inducting with the air supply about 1 to 20 percent by volume based on the primary fuel of said secondary fuel in the high power ranges.

5. In the operation of internal combustion engines of the supercharged compression ignition type, the improvement which comprises starting an engine at low compression ratio upon a relatively high cetane number secondary fuel generally characterized by substantially straight-chain and paraffinic structure and having a cetane number of at least about 45, followed by normal operation of the engine under supercharged conditions at an equivalent high compression ratio on a high B. t. u. content normally liquid primary fuel having a cetane number not greater than about 40 while providing a mixture of air and about 1 to 40 percent by volume based on the primary fuel of said secondary fuel.

6. In the operation of internal combustion engines of the compression ignition type, the improvement which comprises burning a normally liquid primary fuel of cetane number not greater than about 40, said operation being effected while inducting with the air supply about 1 to 20% by volume based on the primary fuel of a secondary fuel having a cetane number above about 55 and generally characterized by substantially straight-chain, paraffinic structure.

7. In the operation of internal combustion engines of the compression ignition type, the improvement which comprises burning a normally liquid primary fuel having a cetane number not greater than about 40, said operation being effected while providing a mixture of air and about 1 to 40 percent by volume based on the primary fuel of a secondary fuel generally characterized by substantially straight-chain, paraffinic structure and having a cetane number of at least about 45.

8. The method of claim 7 wherein the amount of secondary fuel is about 4 to 25%.

9. The method of claim 8 wherein the primary fuel has a cetane number not greater than about 35.

10. The method of claim 8 wherein the primary fuel is a petroleum residual of about 5 to 20 gravity.

11. The method of claim 10 wherein the secondary fuel is a petroleum distillate.

12. The method of claim 8 wherein the primary fuel is a petroleum distillate of about 50 to 75 gravity.

13. The method of claim 12 wherein the secondary fuel is a petroleum distillate.

No references cited.